United States Patent [19]

Matthijsse

[11] 4,257,673
[45] Mar. 24, 1981

[54] DEVICE FOR COUPLING AT LEAST THREE LIGHT GUIDES

[75] Inventor: Pieter Matthijsse, Bergschenhoek, Netherlands

[73] Assignee: De Staat der Nederlanden, Te Dezen Vertegenwoordigd Door de Directeur-Generaal der Posterijen, Telegraphie en Telefonie, Hague, Netherlands

[21] Appl. No.: 970,333

[22] Filed: Dec. 18, 1978

[30] Foreign Application Priority Data

Dec. 22, 1977 [NL] Netherlands ............... 7714270

[51] Int. Cl.³ .................................................. G02B 5/14
[52] U.S. Cl. ........................... 350/96.19; 350/162 R
[58] Field of Search .................... 350/96.19, 162 R

[56] References Cited

U.S. PATENT DOCUMENTS

| | | | |
|---|---|---|---|
| 3,864,016 | 2/1975 | Dakss et al. ................. | 350/96.19 |
| 3,871,742 | 3/1975 | Kaminow et al. ............ | 350/96.19 |
| 3,975,082 | 8/1976 | Winzer ........................ | 350/96.19 |
| 4,057,319 | 11/1977 | Ash et al. .................... | 350/96.19 |
| 4,067,642 | 1/1978 | King et al. ................... | 350/96.19 |
| 4,111,524 | 9/1978 | Tomlinson ................... | 350/96.19 |
| 4,148,556 | 4/1979 | Sauter et al. ................ | 350/96.19 |

OTHER PUBLICATIONS

Nishihara, "Holocoupler: A Novel Coupler for Optical Circuits" in *IEEE Journ. of Quantum Electronics* Sep. 1975.

Auracher, "Verzweigungseinrichtungen für Lichtwellenleiter" in Siemens Forsch W. Entwickl-Ber. vol. 5, No. 1 1976.

*Primary Examiner*—Stewart J. Levy
*Attorney, Agent, or Firm*—Hugh Adam Kirk

[57] ABSTRACT

The invention provides a coupling device for monochromatic optical signals based on the amplitude division method. The optical signal emerging from one light guide is divided by means of one or more diffraction gratings among three or more outgoing light guides. Inversely, the optical signals from a number of light guides can be combined into one optical signal. Such a coupling device has a high optical efficiency, is mode-independent and produces small differences in light intensity between the branch signals.

7 Claims, 10 Drawing Figures

DEVICE FOR COUPLING AT LEAST THREE LIGHT GUIDES

BACKGROUND OF THE INVENTION

In the telecommunication industry, light can be used advantageously as an information carrier. A special problem in this field of technology resides in the devices for dividing and combining light signals. A number of solutions to this problem are presented in the article "Verzweigungseinrichtungen für Lichtwellenleiter" by F. Auracher and others in the magazine "Siemens Forschungs und Entwicklungsberichte" Volume 5 (1976) no. 1.

Basically, two types of branching devices for light signals are known, which work by the following methods respectively:

1. Spatial wave front division.

In this method the radiation emerging from a light guide is spatially divided, after which the various individual light signals are each applied to a following light guide. A drawback of this method is that the division is mode-sensitive. Moreover, losses occur as a result of the fact that the packing density is lower than one.

2. Amplitude division

In this method the total image emerging from a light guide is branched off and the total light energy carried is divided over the branches. An advantage of this method is that it is mode-insensitive. A disadvantage is the small number of possible branches per coupling device.

SUMMARY OF THE INVENTION

The invention relates to a device for coupling at least three light guides for monochromatic light by the amplitude division method. The device according to the invention is characterized by at least one diffraction grating as a coupling element between incoming and outgoing light guides. Although the invention will be further described by means of examples in which mention is made of one incoming and several outgoing light guides, the device according to the invention can also be used for coupling several incoming light guides to one outgoing light guide. Light is to be understood in this context as radiation with a wavelength in or near the optical area.

An object of the invention is to provide a coupling device of the type described with a high efficiency.

Another object of the invention is to provide a device, the outgoing light signals of which have approximately the same intensity.

Still another object is to provide a solution for coupling devices with various numbers of light guides.

BRIEF DESCRIPTION OF THE VIEWS

The above mentioned and other features, objects and advantages, and a manner of attaining them are described more specifically below by reference to embodiments of the invention shown in the accompanying drawings, wherein.

DETAILED DESCRIPTION OF PREFERRED EMBODIMENTS

I. The Apparatus of the Device

Figure 1:
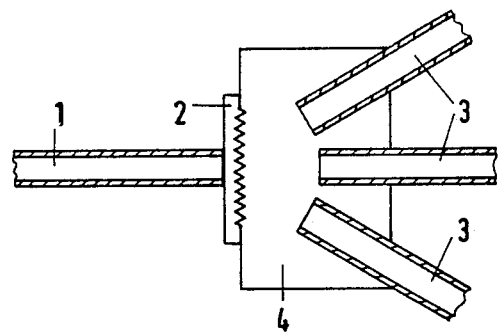
FIG. 1 is a schematic sectional view of one embodiment of the device according to the invention with one diffraction grating.

FIG. 1 shows a basic set-up of the device according to the invention, in which a light signal is conveyed through a light guide 1 to a diffraction grating 2, which divides the light signal among the light guides 3. In order to prevent scattering of the light emerging from light guide 1 as much as possible, light guide 1 is preferably placed as close as possible to diffraction grating 2. The same applies to the distance between diffraction grating 2 and light guides 3. In this example a multiplication factor three has been chosen, but—as will be described later—other multiplication factors are possible too. The diffraction grating referred to here divides the beam emerging from light guide 1 into three smaller beams. The spatial connection between light guide 1 and diffraction grating 2 on the one hand, and that between diffraction grating 2 and light guides 3 on the other, can be realized by means of known techniques. In FIG. 1 light guides 3 are coupled optically and mechanically to the diffraction grating by means of a coupling element 4, which may be manufactured by known techniques of a suitable plastic or glass. It is also possible to provide a thin layer of air, pure water or silicone oil between diffraction grating 2 and coupling element 4. The choice between the above possibilities and other ones not mentioned here is determined by the ratio between the refractive indices $n_1$ of diffraction grating 2 and $n_2$ of the coupling element 4. It is important, however, that the refractive indices of light guide 1, of diffraction grating 2 and of the material between them, if any, do not differ too much, as too great differences are particularly undesirable when a number of light signals are sent from light guides 3 to light guide 1. Owing to reflections on the contact surface with light guide 1, too great a difference between the refractive indices might cause feedback of the signal from one of the light guides 3 into each of the other light guides 3.

Figure 2:
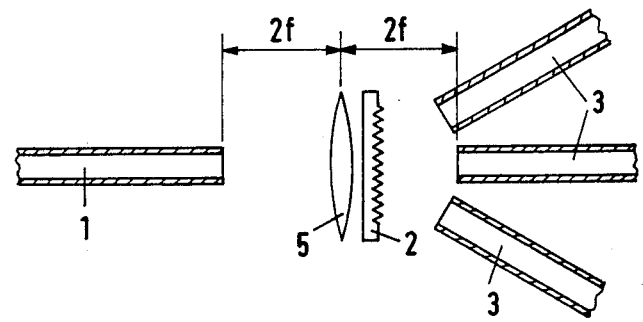
FIG. 2 is a sehcematic sectional view of a preferred embodiment of the device according to the invention with one lens and one diffraction grating.

FIG. 2 shows a preferred embodiment of the device according to the invention. With respect to the embodiment according to FIG. 1 an improvement has been effected by adding lens 5; this corrects the dispersal of the light beam emerging from light guide 1 and improves the efficiency. The choice of the focal distance f of the lens is determined by the size and numerical aperture of the incoming light guide.

Figure 3:
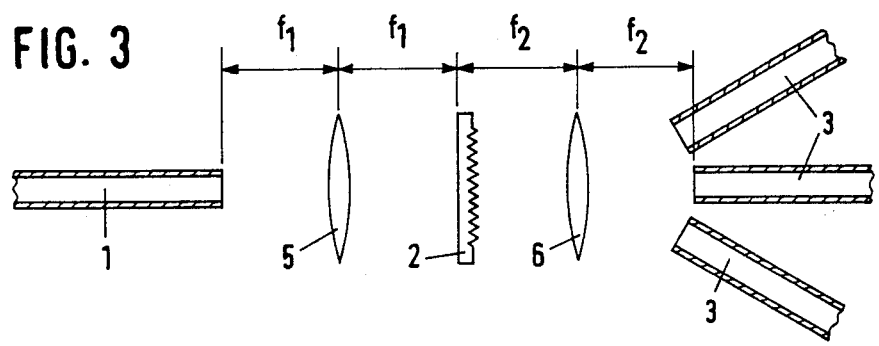
FIG. 3 is a schematic sectional view of another embodiment of the device according to the invention with one diffraction grating and two lenses.

FIG. 3 shows a more elaborated embodiment of the device according to FIG. 2. A single lens does not image the phase distribution; if this is considered a drawback it may be necessary to use a second lens 6. The distance between light guide 1 and lens 5, and that between lens 5 and diffraction grating 2, equals focal distance $f_1$ of lens 5, chosen on the basis of the criteria mentioned above. The distance between diffraction grating 2 and lens 6, and that between lens 6 and light guides 3, equals focal distance $f_2$ of lens 6.

Figure 4:
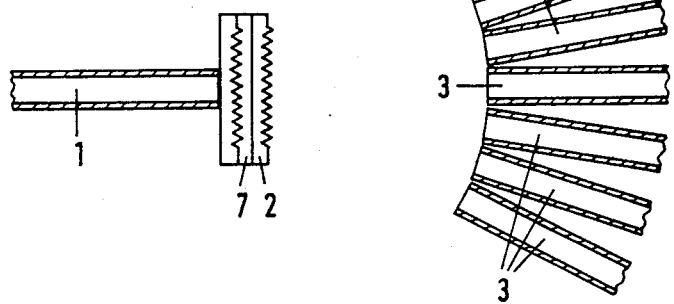
FIG. 4 is a schematic sectional view of still another embodiment of the device according to the invention with two diffraction gratings the patterns of which run parallel.

Another embodiment is represented by FIG. 4, which embodiment differs from those of the preceding figures in that two cascaded diffraction gratings (7 and 2) with different patterns are applied. In this manner a total pattern can be achieved which would be difficult to realize by means of one individual diffraction grating. The two patterns of diffraction gratings 7 and 2 run parallel, so that the separate light signals are in one row, just as in the embodiments described above. The total thickness profile of the two gratings is found by adding the thickness profiles of the individual gratings together. Diffraction gratings 7 and 2 together behave as one diffraction grating. Addition of lenses, as in the embodiments of FIGS. 2 and 3, is also possible in this embodiment. A more concrete embodiment of the diffraction grating in the device according to FIG. 4 will be discussed later.

The device described in the aforegoing are equipped with diffraction gratings causing a division in one plane; such devices are called one-dimensional dividers.

Figure 5:
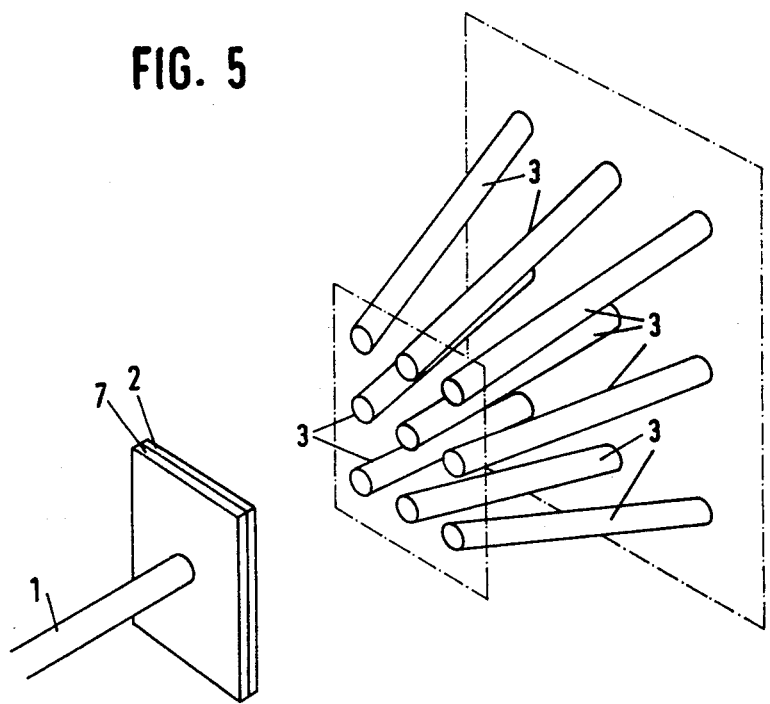
FIG. 5 is a schematic perspective view of a further embodiment of the device according to the invention with two diffraction gratings, the patterns of which are at an angle of about 90°, which gives rise to two-dimensional division.

An embodiment of a two-dimensional divider is shown in FIG. 5. In this embodiment use is made of two diffraction gratings the patterns of which are at an angle of about 90°. The two gratings may be mounted on separate substrates or on either side of one substrate. A third possibility, requiring more advanced production techniques, is that both gratings are made on one side of the substrate. The choice between these techniques is not critical as long as the requirements to be met by the diffraction grating, which will be discussed later, are satisfied. The two gratings should preferably have the same thickness profile. In the embodiment according to FIG. 5 groove patterns with a multiplication factor three are applied. The light signal from light guide 1 will be divided into three light signals by a first diffraction grating 7, after which a further division by three takes place in diffraction grating 2, so that the total multiplication factor is nine. The nine light guides 3 are not placed in one line now, but in a matrix of three times three. In this embodiment, too, lenses can be added as in the embodiments of FIGS. 2 and 3.

II. The Gratings

Figure 6:
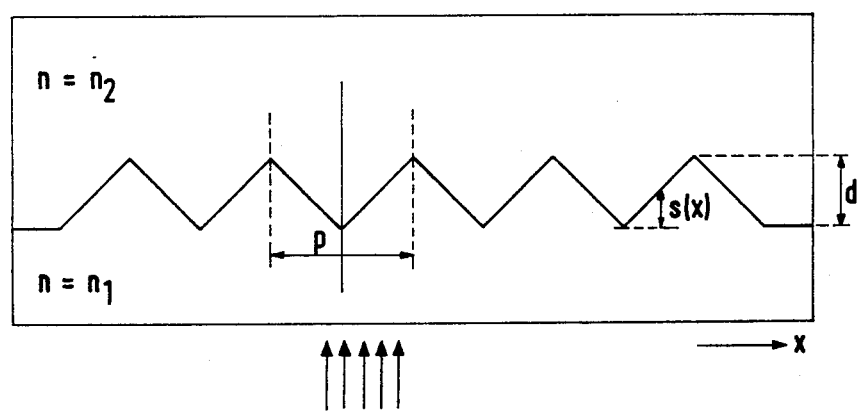
FIG. 6 is an enlarged schematic a cross-section of the plane of refraction of a diffraction grating suitable for the device according to the invention.

The diffraction gratings should be of the thin type. The criteria for a grating being "thin" are described in the article entitled "Sufficient conditions for a thin-filter description of thick phase filters" by P. Matthijsse in the Journal of the Optical Society of America, Vol. 65 No. 11, November 1975, pp 1337—1341. The basic formulae indicating the requirements to be met by such a diffraction grating, given in that article, will be explained with the aid of FIG. 6.

In any point x along the diffraction pattern the condition $$d - s(x) < \frac{n_2}{16\lambda\{F + |\Delta f(x)|\}^2} \quad (1)$$

must be met, where d represents the maximum thickness of the diffraction pattern, s(x) the thickness profile along the x-axis, $\lambda$ the wavelength, F the upper cutoff spatial frequency for the emerging light and $|\Delta f(x)|$ a measure for the frequency shift occurring as a consequence of the slope of the diffraction pattern. This frequency shift can be further defined by $$\Delta f(x) = \frac{(n_1 - n_2)}{\lambda} \cdot \frac{ds(x)}{dx} \quad (2)$$

The cutoff frequency F can be derived from the numerical aperture (NA) of the immediately preceding optical element, using the relation $$F = \frac{NA}{\lambda} \quad (3)$$

A second condition which has to be satisfied is $$\frac{1}{F} > 4\left[\lambda d\left(\frac{1}{n_1} + \frac{1}{n_2}\right)\right]^{\frac{1}{2}} \quad (4)$$

If conditions (1) and (4) are met, the diffraction grating is suitable for the device according to the invention.

III. Application of the Invention

In the following, a number of known surface profiles of diffraction gratings suitable for the purpose of the invention will be mentioned as examples. In each case the following quantities will be given:

1. the phase delay $\Delta\phi$ of the light signal, caused by the diffraction grating;
2. the multiplication factor Q, indicating the number of branches of the device;
3. the relative light intensity variation R indicating the ratio between the light energy in the light guide receiving the greatest amount of light (I max) and that in the light guide receiving the smallest amount of light (I min).

$R = 10 \log I\ max/I\ min$ 4. the efficiency $\eta$, indicating the quotient of the total effective emerging light and the total incident light.

First, however, the manner in which a diffraction grating profile is chosen will be explained.

In manufacturing a suitable diffraction grating the following items are of importance:
1. the pattern or thickness profile s(x); the choice of the profile is mainly determined by the required multiplication factor Q;
2. the total depth of grooves d;

3. the centre to centre distance of period p (see FIG. 6) of the profile;
4. the refractive indices $n_1$ and $n_2$, the choice of which is only limited by the (large) number of types of plastic and glass obtainable on the market.

Further items to be taken into account in the calculation are the core diameter k of the incoming and outgoing light guides and the distance z between the diffraction grating and the outgoing light guides; the distance between the incoming light guide and the diffraction grating is kept as small as possible, in order to limit the influence of the numerical aperture NA of the incoming light guide as much as possible. The angle between each outgoing light guide and the adjacent light guide is given by $$\frac{\lambda}{n_2 p} \quad (5)$$

The thickness is given by $$s(x)_{max} = d = \frac{\Delta\phi \text{ max}}{k(n_1 - n_2)} = \frac{\lambda \Delta\phi \text{ max}}{2\pi (n_1 - n_2)} \quad (6)$$

as $F = \frac{NA}{\lambda}$, (4) changes into $$8 \frac{\Delta\phi \text{ max}}{\pi} \cdot \frac{(n_1 + n_2)}{|n_1 - n_2| n_1 n_2} < \frac{1}{(NA)^2} \quad (7)$$

With a given numerical aperture NA and phase delay $\Delta\phi$, a provisional choice can be made as regards the ratio between refractive indices $n_1$ and $n_2$ by means of (7).

As concerns the second condition, it can be derived from (3) and (1) that:

$$4\sqrt{\lambda \frac{d - s(x)}{n_2}} < \frac{1}{\frac{NA}{\lambda} + \frac{|n_1 - n_2|}{\lambda} \frac{d}{dx} s(x)} \quad (8)$$

By means of (8) an upper limit for the slope $(d/dx)s(x)$ of the profile can be determined. From that value, the lower limit for the period p can be derived for each individual profile. The condition $p \leq (\lambda z/n_2 k)$ must also be taken into account, to avoid that the outgoing light beams overlap in the front plane of the outgoing light guides. In practice, ten grooves per diameter k of the light guide prove to be quite sufficient; 4 can be considered the minimum value. With these data it is possible to calculate the parameters required for a suitable embodiment of the device according to the invention.

Finally, the loss due to the divergence of the various light beams emerging from the diffraction grating should be considered. For the beam width B of each beam can be written $$B = k + \frac{2NA}{n_2} z$$

If the beam width B turns out to be too large, an improvement can be obtained by choosing a different refractive index $n_2$. A second possibility is to choose thicker outgoing light guides, so that their diameter at least equals beam width B.

If a set-up with lenses is used (FIGS. 2 and 3) the calculation is identical to that for an embodiment without lenses, except for the period p. The latter is then determined by the resolving power. In practice 8 to 10 lines in the lens aperture prove to be amply sufficient.

IV. Specific Examples

In the following, a number of examples will be given of known diffraction grating profiles.

Figure 7:
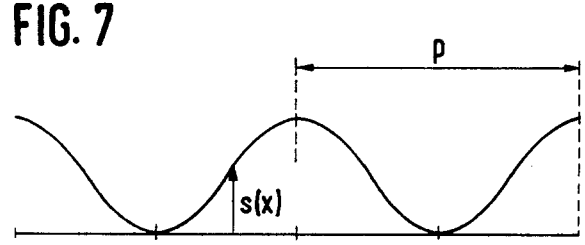
FIG. 7 is an enlarged schematic cross-section of a diffraction grating suitable for application in the device according to the invention with a cosine-shaped pattern.

FIGS. 7, 8, 9 and 10 show cross sections of a thickness profile. For each of these figures Q will be understood to be the number of branches of the pattern obtained by means of one incoming light guide; if Q=9, therefore, a maximum of 9 outgoing light guides can be connected to the incoming light guide; $\eta$ represents the efficiency: the quotient between the amount of incident light and the amount of light radiated to Q points. R is a measure for the difference between a first point $Q_1$ receiving the largest quantity of light and a point $Q_2$ receiving the smallest quantity of light. Obviously, not all the outgoing light beams Q have to be connected to a light guide. The values for the profile of FIG. 7 are:
Q=3
$\eta$=90%
R=0 dB $$\phi(x) = 1.436 \cos \frac{2\pi x}{p}$$

a=1.436 rad

Figure 8:
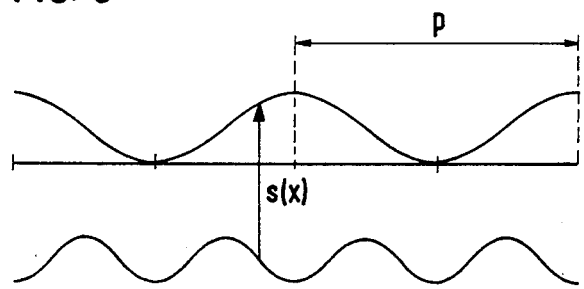
FIG. 8 is an enlarged schematic cross-section of an embodiment of a double diffraction grating with two different patterns running parallel to each other.

The profile of FIG. 8 is an example of a double-faced diffraction grating, which may be composed of two gratings with the flat sides against each other.
The values for the total diffraction grating are:
Q=7
$\eta$=87%
R$\leq$0.6 dB
The phase delay is given by:

$$\phi(x) = 1.295 \cos \frac{2\pi x}{p} + 1.632 \cos \frac{4\pi x}{p}$$

Figure 9:
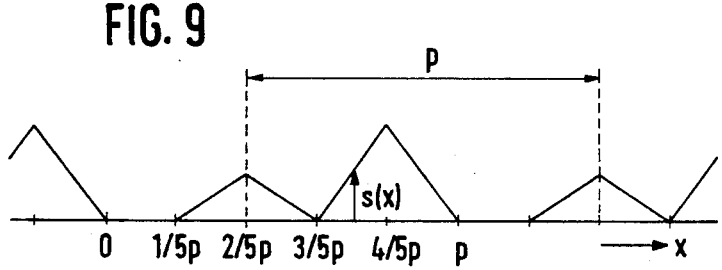
FIG. 9 is an enlarged schematic cross-section of an embodiment of a diffraction grating suitable for the device according to the invention with a pattern which is not symmetric per period.

FIG. 9 gives an example of a suitable diffraction grating with an irregular thickness profile per period. Its values are:
Q=9
$\eta$=83%
R$\leq$1.8 dB
where $$\phi(x) = 0 \text{ for } 0 \leq x \leq \frac{1}{5} p$$

$$\phi(x) = \pi \text{ tri} \left(\frac{5x}{p} - 4\right) \text{ for } \frac{1}{5} p \leq x \leq \frac{3}{5} p$$

$$\phi(x) = 2\pi \text{tri} \left(\frac{5x}{p} - 4\right) \text{ for } \frac{3}{5} p \leq x \leq p$$

where tri$(x) = 1 + x$ for $-1 \leq x \leq 0$ $= 1 - x$ for $0 \leq x \leq 1$ $= 0$ for the remaining area.

A variation on the profile of FIG. 9 is given by the following values:

$$\phi(x) = 0 \quad \text{for } 0 \leq x \leq \frac{1}{5} p$$

$$\phi(x) = 2\pi \text{tri}(\frac{5x}{p} - 2) \text{ for } \frac{1}{5} p \leq x \leq \frac{3}{5} p$$

$$\phi(x) = 4\pi \text{tri}(\frac{5x}{p} - 4) \text{ for } \frac{3}{5} \leq x \leq p$$

A diffraction grating satisfying these conditions is described by:

Q=23
η=95%
R=2.2 dB

A remarkable feature of this diffraction grating is the high value of Q and the great efficiency which is nevertheless attained.

Figure 10:
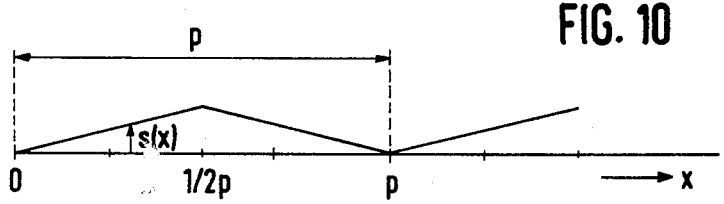
FIG. 10 is an enlarged schematic cross-section of another embodiment of a diffraction grating suitable for the device according to the invention.

The values for the diffraction grating of FIG. 10, which is in particular attractive because of the relative simplicity of its manufacture, are as follows:
Q=3
η=85%
R=0 dB
the phase delay being given by:

$$\phi(x) = 3.64 \, \text{tri} \left( \frac{2x}{p} - 1 \right) \text{ for } 0 \leq x \leq p$$

It stands to reason that the choice of a diffraction grating for the device according to the invention need not be limited to the examples given in the aforegoing. It should moreover be stated that Q applies to diffraction gratings for one-dimentional use. If two identical diffraction gratings are used behind each other, their profiles preferably being at a 90° angle (FIG. 5), there will be $Q^2$ outgoing light patterns. The use of a two-dimensional light divider unfavourably influences the efficiency, but in comparison with known dividers, devices according to the invention represent a considerable improvement.

While there is described above the principles of this invention in connection with specific apparatus, it is to be clearly understood that the description is made only by way of example and not as a limitation to the scope of this invention.

I claim:

1. A device for intercoupling a monochromatic light signal in one light guide with at least two other light guides simultaneously, by the amplitude division method comprising:
    a first light source transmitting a monochromatic light signal, which is coupled into a thin diffraction grating with a thickness profile that meets the condition $$d - s(x) < \frac{n^2}{16 \lambda \{F + | \Delta f(x) | \}^2},$$

wherein d is the maximum thickness of the diffraction pattern, x is any point along the diffraction pattern, s(x) is the thickness profile along the x axis, n is the refractive index of the grating, λ is the wave length, F is the upper cut-off spatial frequency for emerging light, and $|\Delta f(x)|$ is a measure for the frequency shift occurring as a consequence of the slope of the diffraction pattern.
    and a cut-off frequency that meets the condition $$\frac{1}{F} > 4 \, [\lambda d \, ( \frac{1}{n_1} + \frac{1}{n_2} ) ]^{\frac{1}{2}},$$

wherein n1 and n2 are the refractive indices of the media on each side of the groved surface of the grating; and
    a plurality of outgoing light guides each receiving said monochromatic light signal from said diffraction grating.

2. A device according to claim 1, comprising two diffraction gratings with the pattern of the first diffraction grating being practically parallel to the pattern of the second diffraction grating.

3. A device according to claim 1, comprising two diffraction gratings, the patterns of which differ at an angle of approximately 90°.

4. A device according to claim 1 including a lens between said grating and said incoming light guide.

5. A device according to claim 4 wherein said lens is spaced from said light guides a distance corresponding to its focal lengths.

6. A device according to claim 4 including a lens between said grating and said outgoing light guide.

7. A device according to claim 6 wherein said lenses are spaced from said light guides and said grating distances corresponding to their respective focal lengths.

* * * * *

UNITED STATES PATENT AND TRADEMARK OFFICE
CERTIFICATE OF CORRECTION

PATENT NO. : 4,257,673
DATED : March 24, 1981
INVENTOR(S) : Pieter Matthijsse

It is certified that error appears in the above-identified patent and that said Letters Patent are hereby corrected as shown below:

Column 2, line 1, change "sehcematic" to - - schematic - - . Column 5, line 1, change "of" to - - or - - . Column 6, line 51, change "4" to - - 2 - - . Column 7, line 23, change "dimentional" to - - dimensional - -.

Signed and Sealed this

Eleventh Day of August 1981

[SEAL]

Attest:

Attesting Officer

GERALD J. MOSSINGHOFF
Commissioner of Patents and Trademarks